United States Patent
Tomes et al.

(10) Patent No.: US 12,503,960 B1
(45) Date of Patent: Dec. 23, 2025

(54) BUCKLING SPOKED FRANGIBLE BEARING SUPPORT

(71) Applicant: Pratt & Whitney Canada Corp., Québec (CA)

(72) Inventors: Nathan Tomes, Hamilton (CA); Tyler Richardson, Toronto (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/749,184

(22) Filed: Jun. 20, 2024

(51) Int. Cl.
*F01D 25/16* (2006.01)

(52) U.S. Cl.
CPC ........ *F01D 25/162* (2013.01); *F05D 2240/54* (2013.01); *F05D 2240/60* (2013.01)

(58) Field of Classification Search
CPC . F01D 25/162; F05D 2240/54; F05D 2240/60
See application file for complete search history.

(56) References Cited

U.S. PATENT DOCUMENTS

| | | | |
|---|---|---|---|
| 6,079,200 A | 6/2000 | Tubbs | |
| 7,448,808 B2 | 11/2008 | Bouchy et al. | |
| 8,091,371 B2 * | 1/2012 | Durocher | F01D 25/28 |
| | | | 415/213.1 |
| 8,245,518 B2 * | 8/2012 | Durocher | F01D 25/162 |
| | | | 415/142 |
| 8,430,622 B2 | 4/2013 | Webster et al. | |
| 9,777,596 B2 * | 10/2017 | Raykowski | F16C 33/586 |
| 10,156,154 B2 * | 12/2018 | Denis | F01D 21/045 |
| 10,274,017 B2 * | 4/2019 | Ganiger | F01D 21/045 |
| 11,105,223 B2 * | 8/2021 | Ganiger | F16C 19/06 |
| 11,499,447 B2 * | 11/2022 | Lefebvre | F16C 19/54 |
| 11,702,993 B2 | 7/2023 | Buchholz | |
| 2020/0157971 A1 | 5/2020 | Buchholz et al. | |

FOREIGN PATENT DOCUMENTS

| | | |
|---|---|---|
| CA | 2884998 A1 | 10/2015 |
| CA | 2861291 C | 11/2021 |
| FR | 2877994 A1 | 5/2006 |
| GB | 663021 A | 12/1951 |
| WO | 2015175002 A1 | 11/2015 |

OTHER PUBLICATIONS

Extended European Search Report for EP Application No. 25184068. 2, dated Nov. 6, 2025, pp. 1-8.

* cited by examiner

*Primary Examiner* — Jesse S Bogue
(74) *Attorney, Agent, or Firm* — CANTOR COLBURN LLP

(57) ABSTRACT

A bearing arrangement of a gas turbine engine includes a bearing supportive of a shaft, a bearing support extending from the bearing housing to the bearing to support the bearing, and one or more radial bearing supports including a plurality of radial spokes extending between the bearing housing and the bearing. The plurality of radial spokes are configured to buckle under compression when radial loads at the bearing exceed a predetermined threshold.

18 Claims, 9 Drawing Sheets

BUCKLING SPOKED FRANGIBLE BEARING SUPPORT

BACKGROUND

Exemplary embodiments pertain to the art of turbomachinery such as gas turbine engines. In particular, the present disclosure relates to bearing assemblies and support of bearing assemblies of gas turbine engines.

During a fan blade off event (FBO), some designs require that two bearings on the engine be broken to help limit the load and vibrations transferred from the rotor to the engine and aircraft structure caused by the unbalance resulting from the FBO.

A typical bearing support 200 configuration is illustrated in FIG. 16. A first bearing 202 is a roller bearing supporting radial loads, and requires low support stiffness and is broken by buckling of a first bearing support 204. A second bearing 206 is a ball bearing, supportive of axial and radial loads. The second bearing 206 requires high support stiffness and is broken by fracturing bolts 210 between the second bearing 206 and a second bearing support 208. Configuring the bolts 210 to always break at FBO, requiring high stress, but to not yield at limit loads or during installation and have a full low-cycle fatigue life, all requiring low stress, is very difficult.

BRIEF DESCRIPTION

In one exemplary embodiment, a bearing arrangement of a gas turbine engine includes a bearing supportive of a shaft, a bearing support extending from the bearing housing to the bearing to support the bearing, and one or more radial bearing supports including a plurality of radial spokes extending between the bearing housing and the bearing. The plurality of radial spokes are configured to buckle under compression when radial loads at the bearing exceed a predetermined threshold.

Additionally or alternatively, in this or other embodiments the radial bearing support includes an outer ring disposed at the bearing housing, and the plurality of radial spokes extend from the outer ring to the bearing.

Additionally or alternatively, in this or other embodiments a spoke tip of each of the radial spokes are configured to contact the bearing while not being secured thereto.

Additionally or alternatively, in this or other embodiments one or more bumpers are axially offset from the radial bearing support and are configured to limit radial travel of the bearing.

Additionally or alternatively, in this or other embodiments the one or more bumpers is two bumpers, and the radial bearing support is disposed axially between the two bumpers.

Additionally or alternatively, in this or other embodiments the plurality of spokes are configured to buckle tangentially.

Additionally or alternatively, in this or other embodiments the radial bearing support includes an inner ring positioned at the bearing, and the plurality of radial spokes extend from the inner ring to the bearing housing.

Additionally or alternatively, in this or other embodiments the plurality of radial spokes are not secured to the bearing housing.

Additionally or alternatively, in this or other embodiments the one or more radial supports includes a first radial support and a second radial support axially offset from the first radial support.

Additionally or alternatively, in this or other embodiments a bumper is positioned axially between the first radial support and the second radial support.

In another exemplary embodiment, a gas turbine engine includes a combustor, a turbine driven by combustion products of the combustor, a shaft driven by rotation of the turbine, and a bearing arrangement supportive of the shaft. The bearing arrangement includes a bearing, a bearing support extending from the bearing housing to the bearing to support the bearing, and one or more radial bearing supports including a plurality of radial spokes extending between the bearing housing and the bearing, the plurality of radial spokes configured to buckle under compression when radial loads at the bearing exceed a predetermined threshold.

Additionally or alternatively, in this or other embodiments the radial bearing support includes an outer ring disposed at the bearing housing, and the plurality of radial spokes extend from the outer ring to the bearing.

Additionally or alternatively, in this or other embodiments a spoke tip of each of the radial spokes are configured to contact the second bearing while not being secured thereto.

Additionally or alternatively, in this or other embodiments one or more bumpers are axially offset from the radial bearing support and are configured to limit radial travel of the bearing.

Additionally or alternatively, in this or other embodiments the one or more bumpers is two bumpers, and the radial bearing support is positioned axially between the two bumpers.

Additionally or alternatively, in this or other embodiments the plurality of spokes are configured to buckle tangentially.

Additionally or alternatively, in this or other embodiments the radial bearing support includes an inner ring positioned at the bearing, and the plurality of radial spokes extend from the inner ring to the bearing housing.

Additionally or alternatively, in this or other embodiments the plurality of radial spokes are not secured to the bearing housing.

Additionally or alternatively, in this or other embodiments the one or more radial supports includes a first radial support and a second radial support axially offset from the first radial support.

Additionally or alternatively, in this or other embodiments a bumper is positioned axially between the first radial support and the second radial support.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
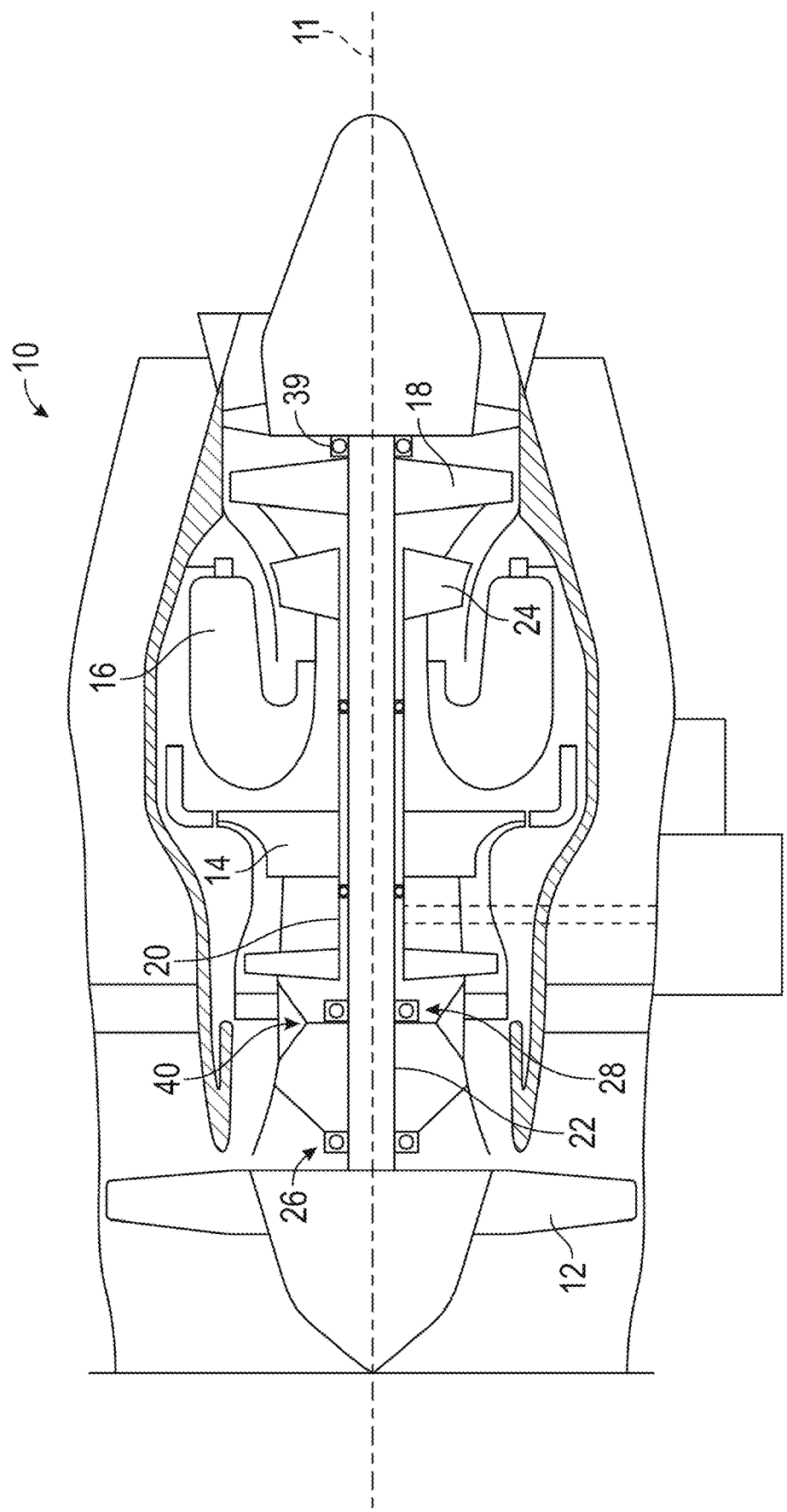
FIG. 1 is a partial cross-sectional view of a gas turbine engine.

FIG. 1 illustrates a turbofan gas turbine engine 10 of a type preferably provided for use in subsonic flight and generally comprising a low pressure spool assembly, which includes a fan assembly 12, a low pressure compressor assembly (not shown) and a low pressure turbine assembly 18 connected by a low pressure shaft 22, and a high pressure spool assembly, which includes a high pressure compressor assembly 14 and a high pressure turbine assembly 24 connected by a high pressure shaft 20. The engine 10 further comprises a combustor 16 in which compressed air from the high pressure compressor 14 is mixed with fuel and ignited for generating an annular stream of hot combustion gases from which the low pressure and high pressure turbine sections extract energy, as known in the art.

The low pressure spool is rotatably supported by a number of axially spaced-apart bearings concentrically mounted about the central axis 11 of the engine 10. The low pressure shaft 22 is supported at its front or upstream end by first and second bearings 26 and 28 respectively commonly referred to as the #1 and #2 bearings and at a rear end thereof by a third bearing 39 which may be the #5 bearing of the engine (the #3 and #4 bearings rotatably supporting the high pressure shaft 20). The bearing arrangement for a particular engine, including but not limited to the number and type of bearings selected, is typically determined by a number of factors specific to that engine.

The bearing arrangement described herein is exemplary only, and is not intended to be limiting. In this example, the forward and rearward most bearings, i.e. the #1 and #5 bearings, may be roller bearings for radially supporting the low pressure shaft 22. As shown in FIG. 1, the first bearing 26 is disposed adjacent the fan rotor, while the #2 bearing 28 is disposed adjacent to and downstream from the first bearing 26, and upstream of the high pressure compressor 14 relative to a flow direction of the gases through the engine 10. The bearings and supporting structure flanges may be arranged in any suitable fashion in the context of the present application.

Figure 2:
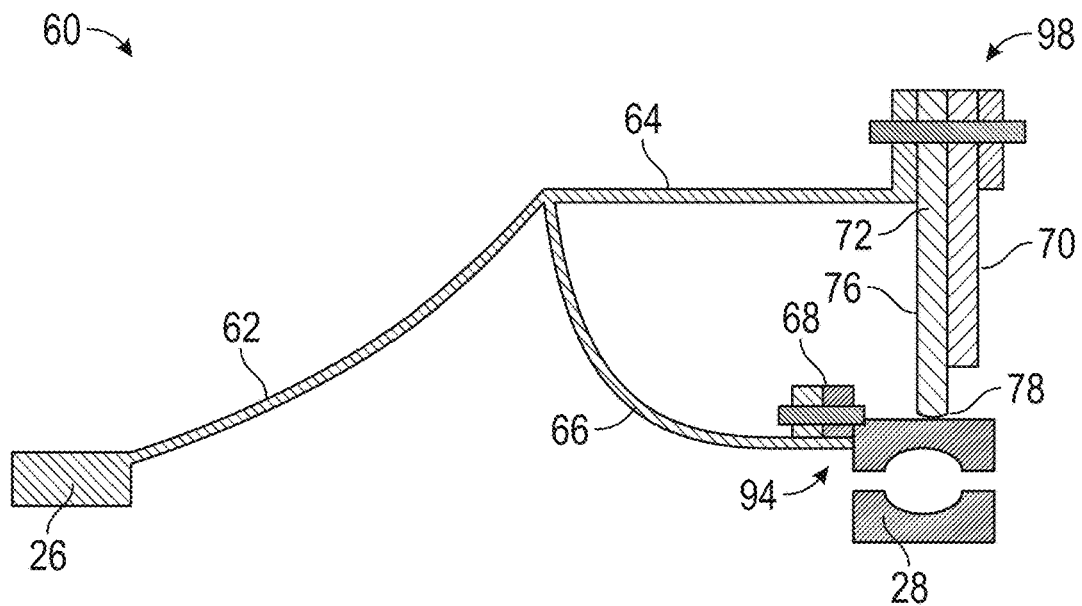
FIG. 2 is a schematic cross-sectional view of an embodiment of a bearing support arrangement of a gas turbine engine.

Referring now to FIG. 2, illustrated is an embodiment of a bearing support arrangement 60. The first bearing 26, a roller bearing, which is also illustrated in FIG. 1, is supported and positioned by a first bearing support 62, which extends from a bearing housing 64. The second bearing 28, a ball bearing, which is also illustrated in FIG. 1, is supported by a second bearing support 66, which also extends from the bearing housing 64. While the embodiments herein describe and illustrate the second bearing support 66 extending from the bearing housing 64, one skilled in the art will readily appreciate that in other embodiments, the second bearing support 66 could extend from other engine structure. The second bearing support 66 must provide sufficiently stiff axial support for the second bearing 28 for rotor stability, but it must not carry significant radial loading. This can be achieved with features like a squirrel cage or hairpin. In some embodiments, the second bearing support 66 can have a shared load path with the first bearing support 62, but this is not required. Additionally, while in the embodiments described herein, the first bearing 26 and first bearing support 62 are illustrated and described, it is to be appreciated that in other embodiments, the first bearing 26 and the first bearing support 62 are not present or necessary to achieve the operation of the present disclosure.

Figure 15:
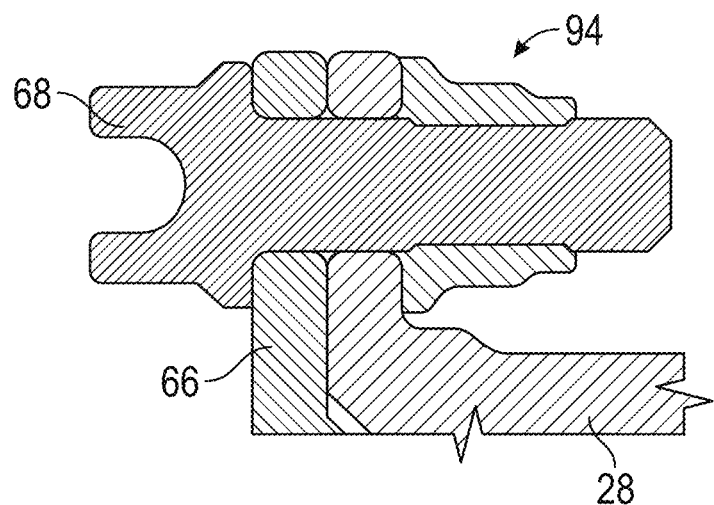
FIG. 15 is a cross-sectional illustration of an embodiment of an inner flange arrangement.
Figure 16:
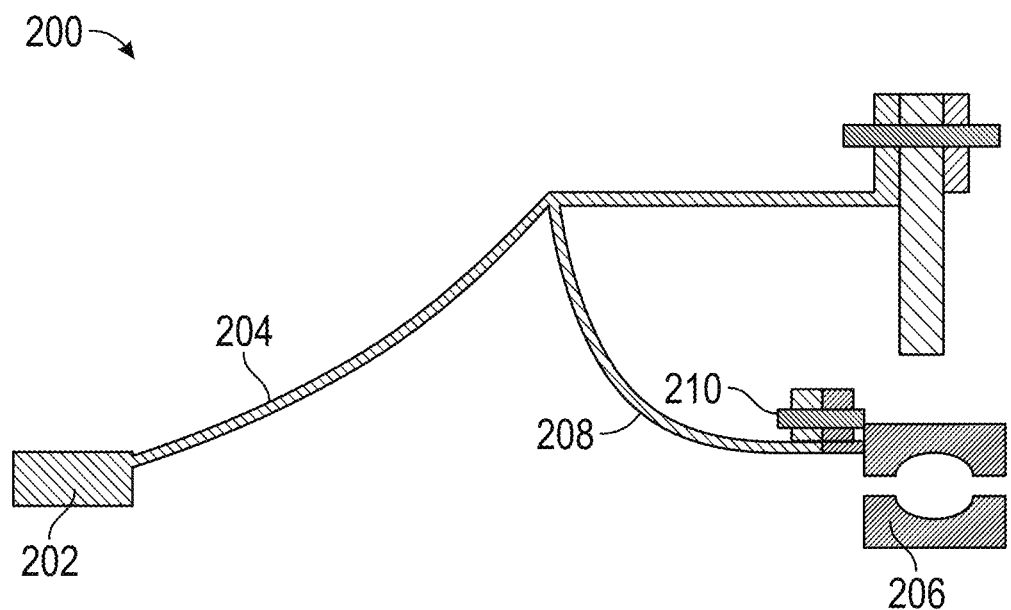
FIG. 16 is a schematic illustration of a previous bearing support arrangement of a gas turbine engine.

Bolts 68 are disposed between the second bearing 28 and the second bearing support 66, and are configured to fracture in a fan blade off (FBO) condition. As illustrated in FIG. 15, the bolts 68 extend through an inner flange arrangement 94 to connect the second bearing support 66 to the second bearing 28. A bumper 70 extends from the bearing housing 64 radially inwardly toward the second bearing 28 to limit radial displacement of the second bearing 28. Additionally, a radial support 72 surrounds the second bearing 28.

Figure 3:
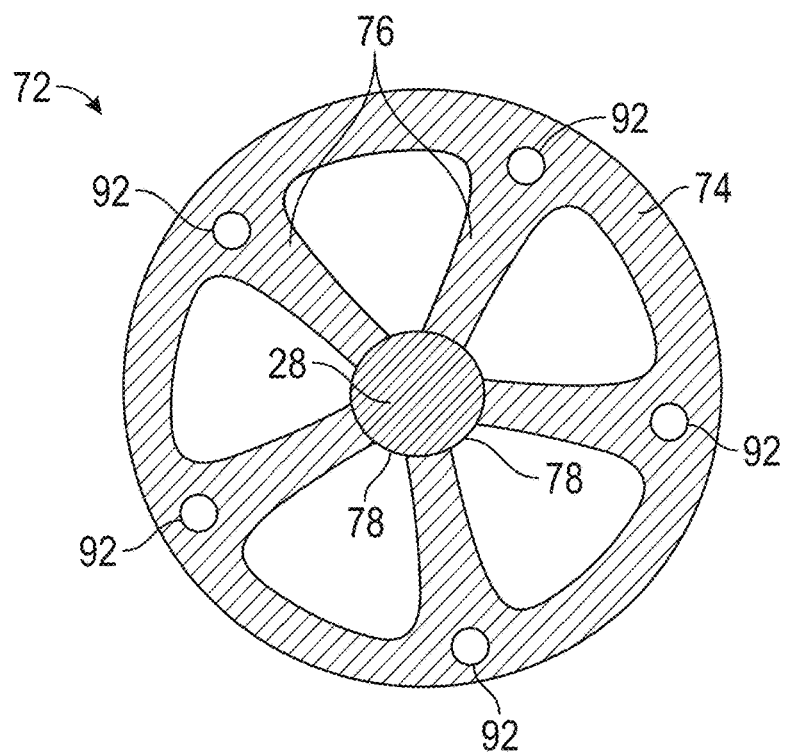
FIG. 3 is a cross-sectional view of an embodiment of a radial support of a bearing arrangement.
Figure 14:
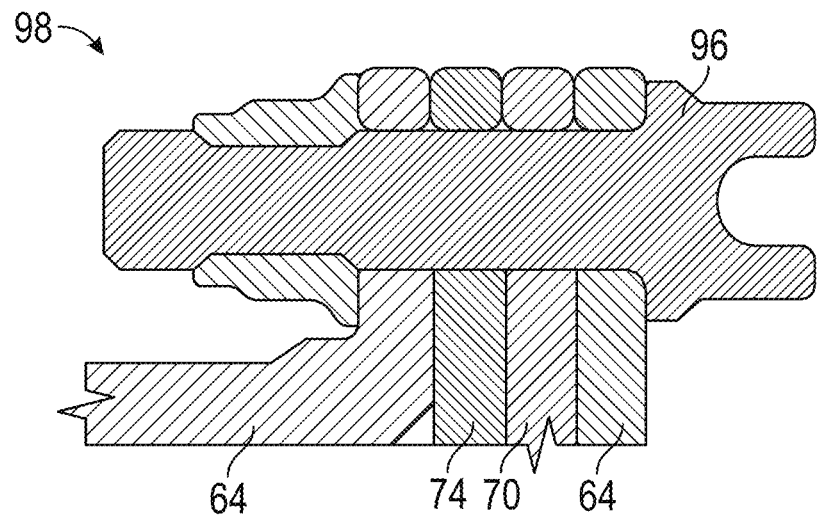
FIG. 14 is a cross-sectional illustration of an embodiment of an outer flange arrangement.

Referring now to FIG. 3, an embodiment of the radial support 72 is illustrated. The radial support 72 includes an outer ring 74 disposed at and secured to the bearing housing 64, and a plurality of radial spokes 76 extending from the outer ring 74 toward the second bearing 28. In some embodiments, as illustrated in FIG. 14, the outer ring 74 is secured to the bearing housing 64 and the bumper 70 at outer flange arrangement 98 using fasteners 96 extending through fastener openings shown schematically at 92. Referring again to FIG. 3, the radial spokes 76 each include a spoke tip 78 that contacts the second bearing 28, but is not secured to the second bearing 28. Referring again to FIG. 2, the spoke tip 78 includes an uneven profile, one that is, for example, curvilinear, to both ensure compression on the spoke 76 and to ensure that the radial contact force of the second bearing 28 is axially centered on the spoke 76. The spokes 76 are configured to buckle to limit the loads in the engine 20 during an FBO event while also providing a high radial stiffness during normal operation. Buckling of the spokes 76 occurs when there are compressive loads on the spokes 76 above a predetermined level. The failure force required for such buckling to occur is significantly less than the failure force required without buckling, which causes the engine 20 to feel less stress.

The buckling capacity of the radial support 72 is configured to be greater than ultimate maneuver loads of the aircraft, but less than those experienced during FBO. If desirable, the buckling capacity can be set such that buckling only occurs under rundown when a fan resonance occurs that increases the radial forces beyond those during the initial containment event.

Figure 4:
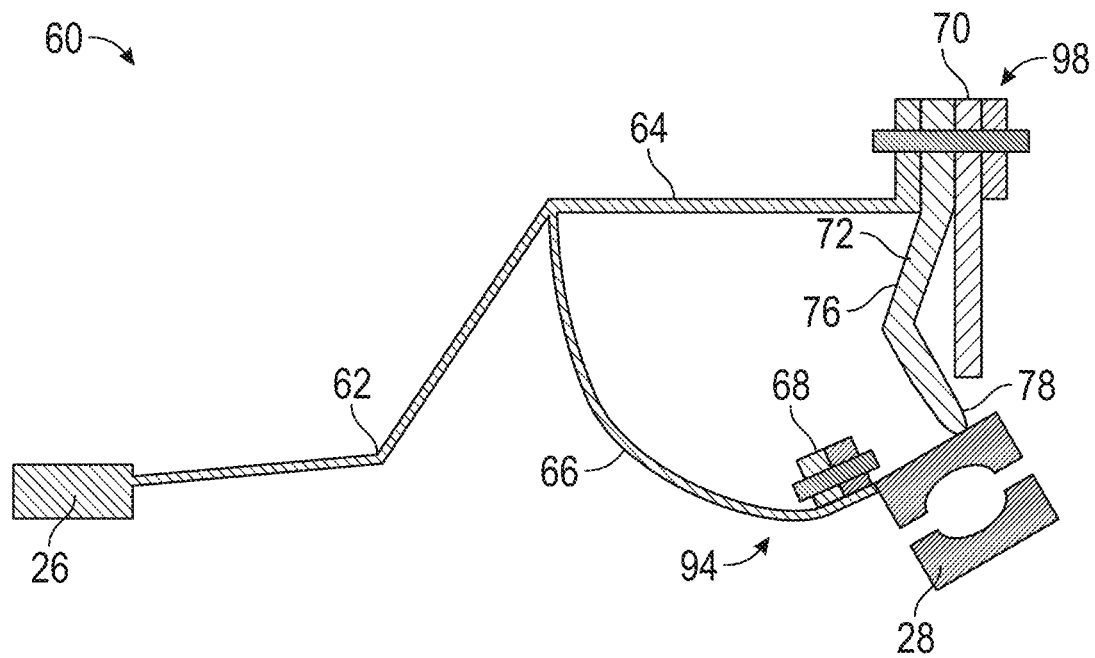
FIG. 4 is a schematic cross-sectional view of the embodiment of FIG. 2 in a fan blade off (FBO) event.

During a FBO event, as illustrated in FIG. 4 the spoked support 72 buckles under compression due to radial travel of the second bearing 28 caused by imbalance of the fan rotor, thus buckling the second bearing support 66.

Figure 5:
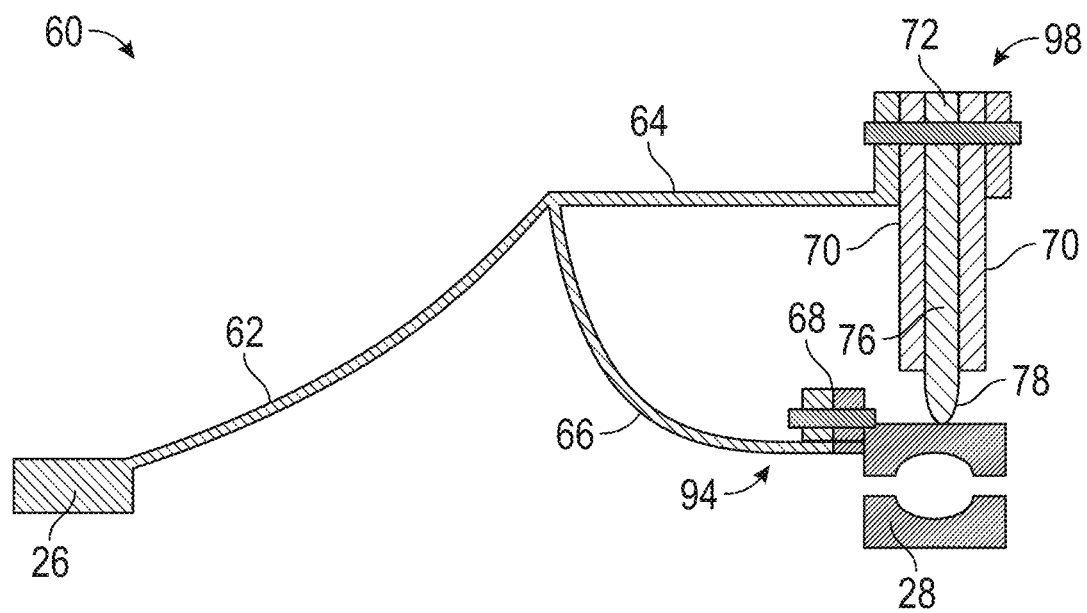
FIG. 5 is a schematic cross-sectional view of another embodiment of a bearing support arrangement of a gas turbine engine.
Figure 6:
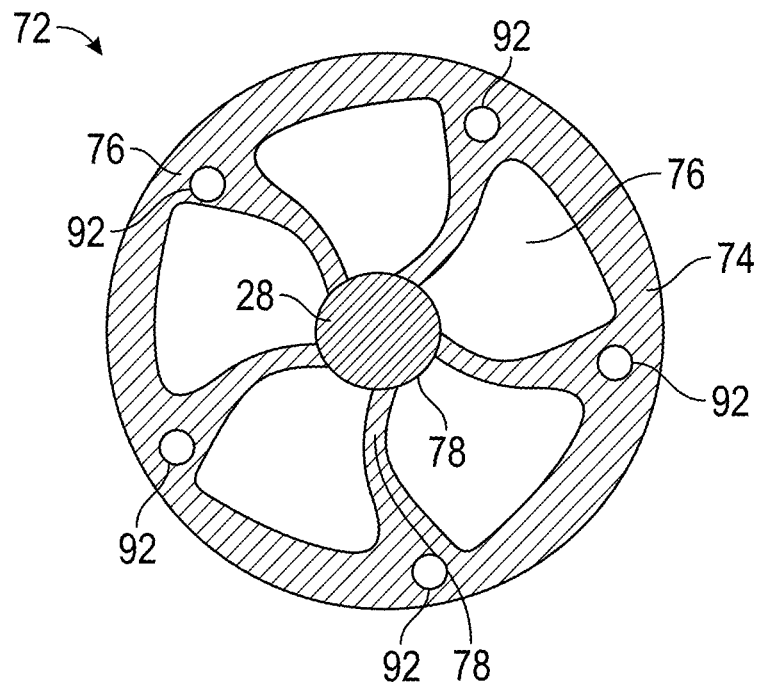
FIG. 6 is a cross-sectional view of another embodiment of a radial support of a bearing arrangement.
Figure 7:
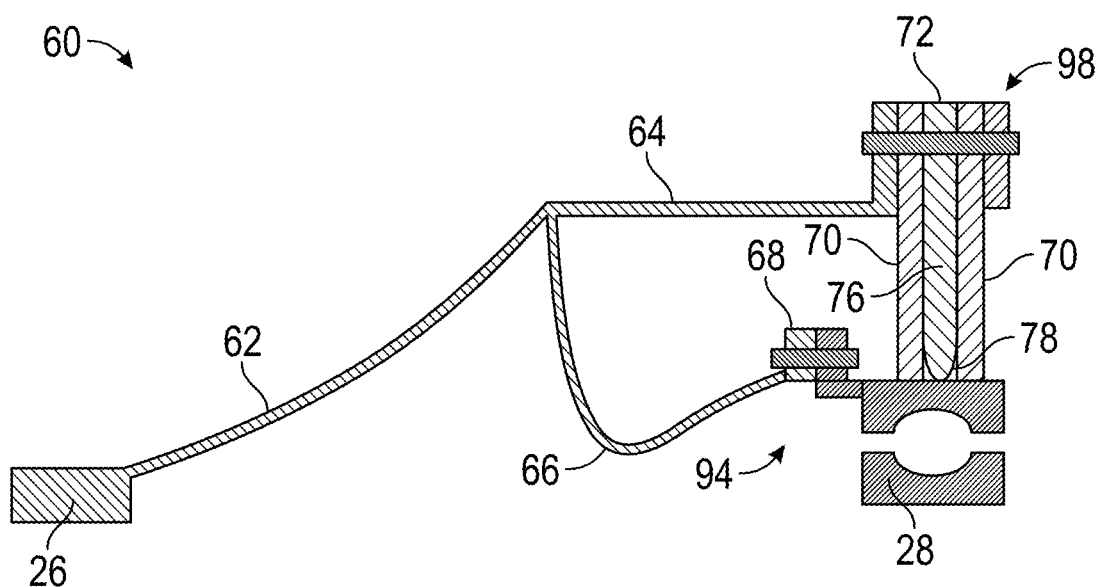
FIG. 7 is a schematic cross-sectional view of the embodiment of FIG. 5 in a fan blade off (FBO) event.

Another embodiment is illustrated in FIGS. 5-7. In this embodiment, the radial support 72 is positioned axially between two bumpers 70, which sandwich the radial support 72. This allows the radial support 72 to buckle without axial deflection. As illustrated in FIG. 6, the radial spokes 76 are configured to buckle tangentially. When the spokes 76 buckle tangentially, as shown in FIG. 7, the spoke tips 78 translate radially outwardly and the second bearing 28 is then supported by the two bumpers 70.

Figure 8:
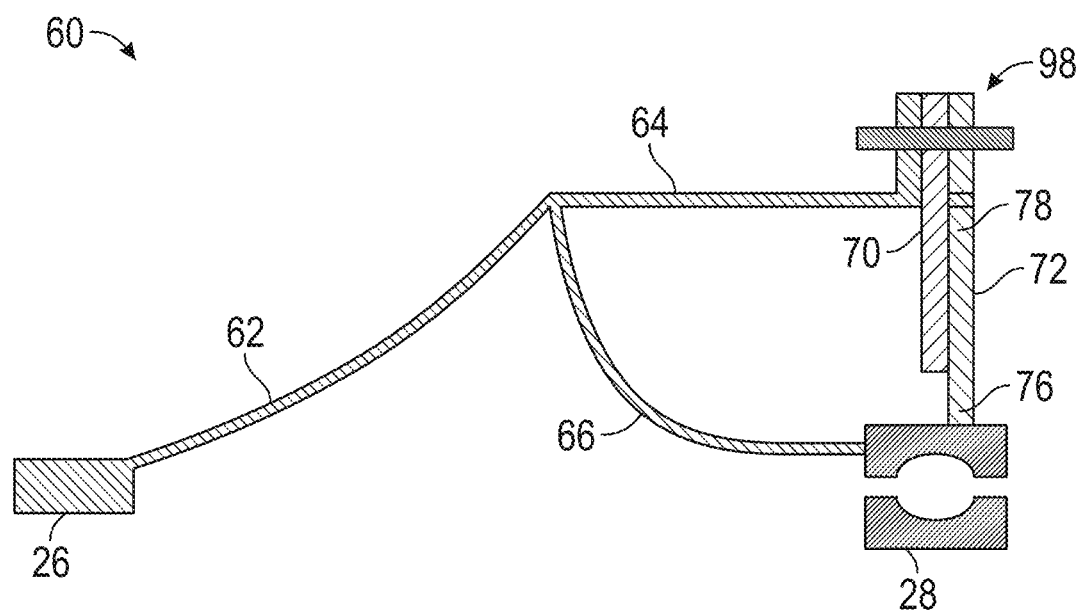
FIG. 8 is a schematic cross-sectional view of yet another embodiment of a bearing support arrangement of a gas turbine engine.
Figure 9:
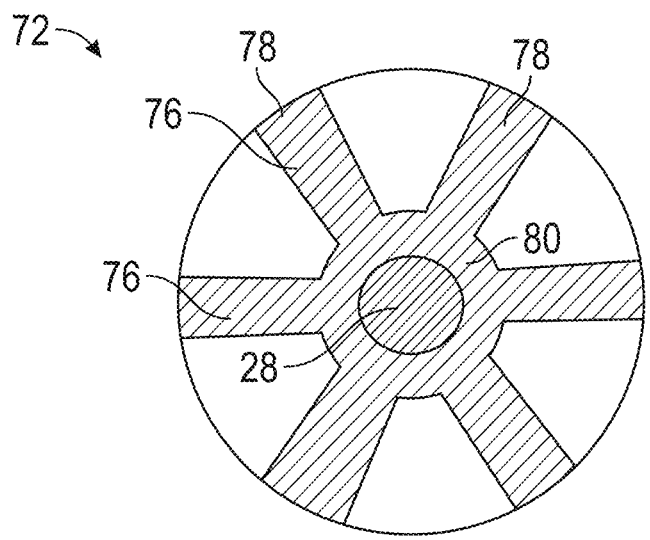
FIG. 9 is a cross-sectional view of yet another embodiment of a radial support of a bearing arrangement.
Figure 10:
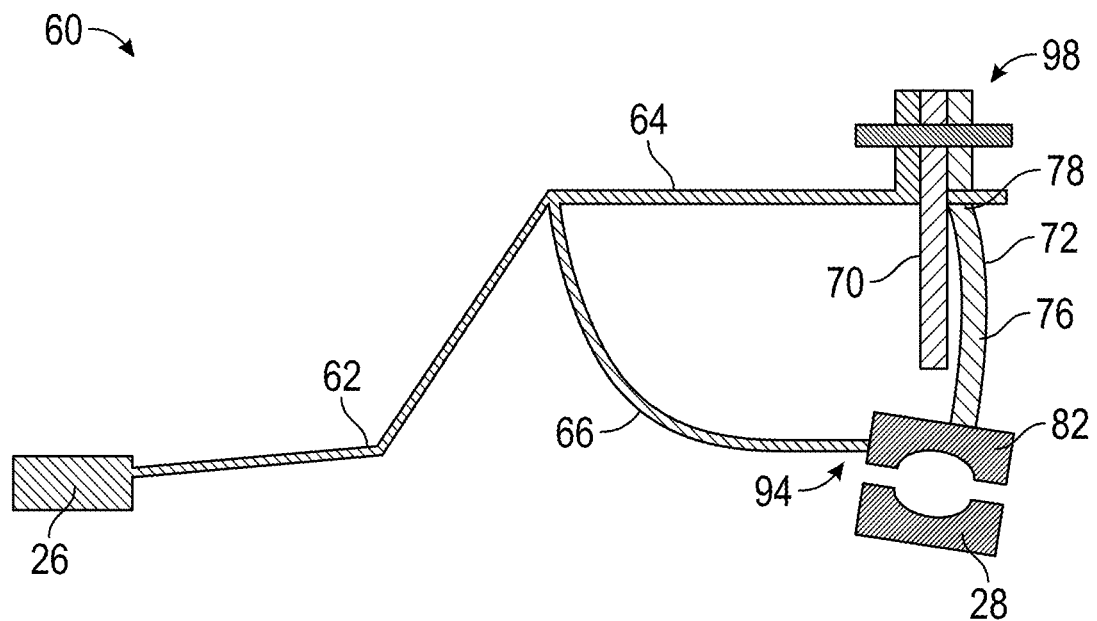
FIG. 10 is a schematic cross-sectional view of the embodiment of FIG. 8 in a fan blade off (FBO) event.

In a third embodiment, illustrated in FIGS. 8-10, the radial support 72 includes a full ring hub 80 at the second bearing 28 and the plurality of spokes 76 extend radially outwardly from the hub 80 toward the bearing housing 64. The spoke tips 78 contact, but are not secured to the bearing housing 64, and nor are the spokes 76 connected to each other at the bearing housing 64. In this configuration, if the second bearing 28, and in particular a bearing outer race 82 tilts due to cross-cornering of the second bearing 28, the spokes 76 will be destabilized, thereby reducing the radial force required for buckling of the spokes 76. The configuration is, however, also applicable to bearings 28 that do not cross-corner.

Figure 11:
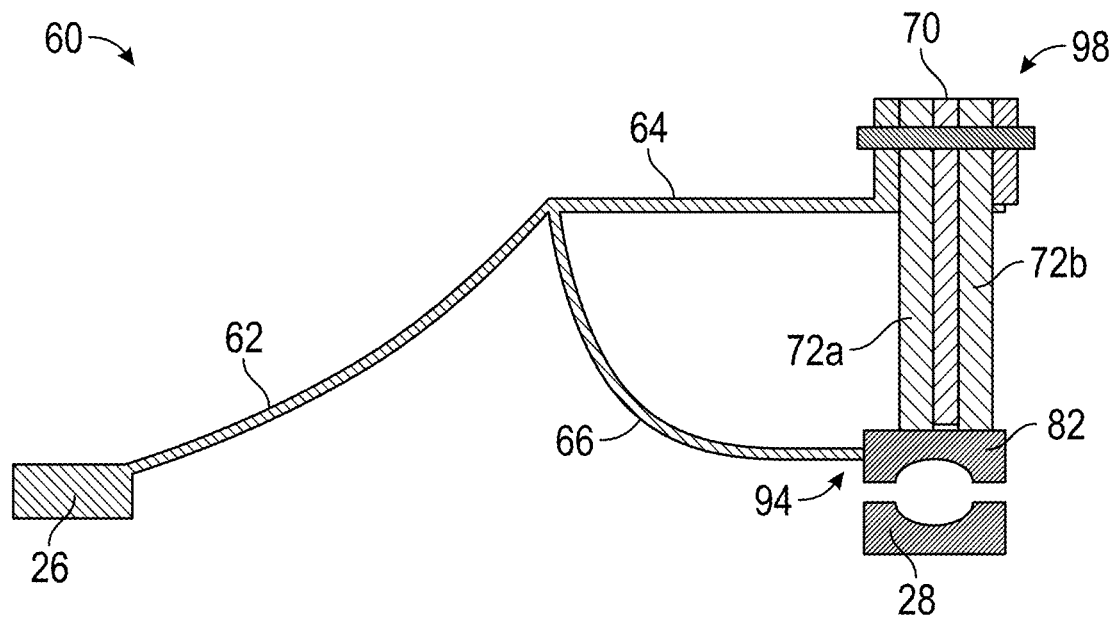
FIG. 11 is a schematic cross-sectional view of still another embodiment of a bearing support arrangement of a gas turbine engine.
Figure 12:
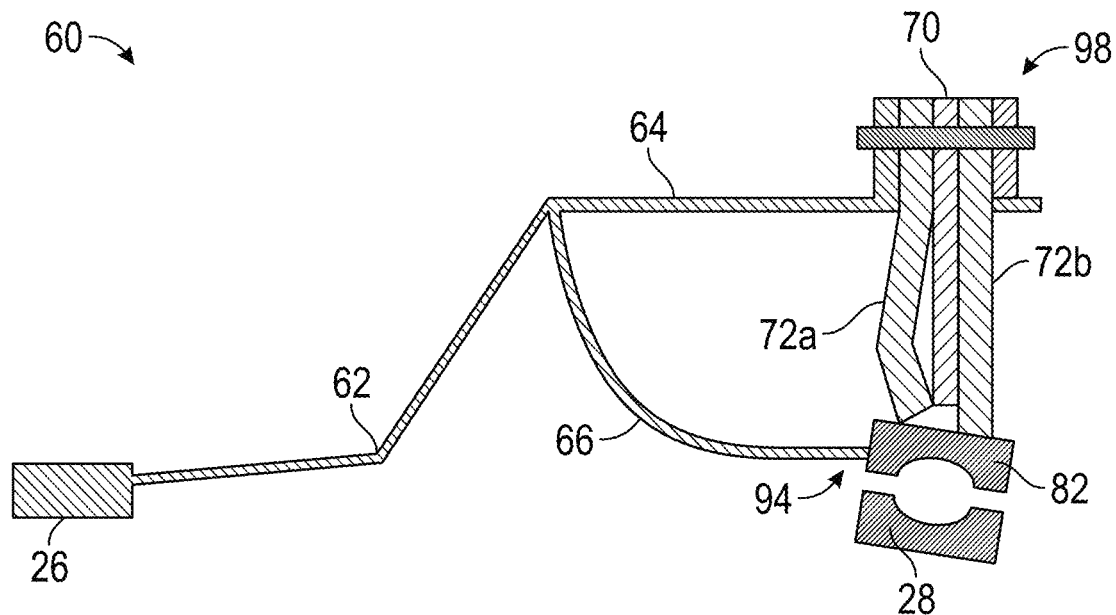
FIG. 12 is a first cross-sectional view of the embodiment of FIG. 11 in a fan blade off (FBO) event.
Figure 13:
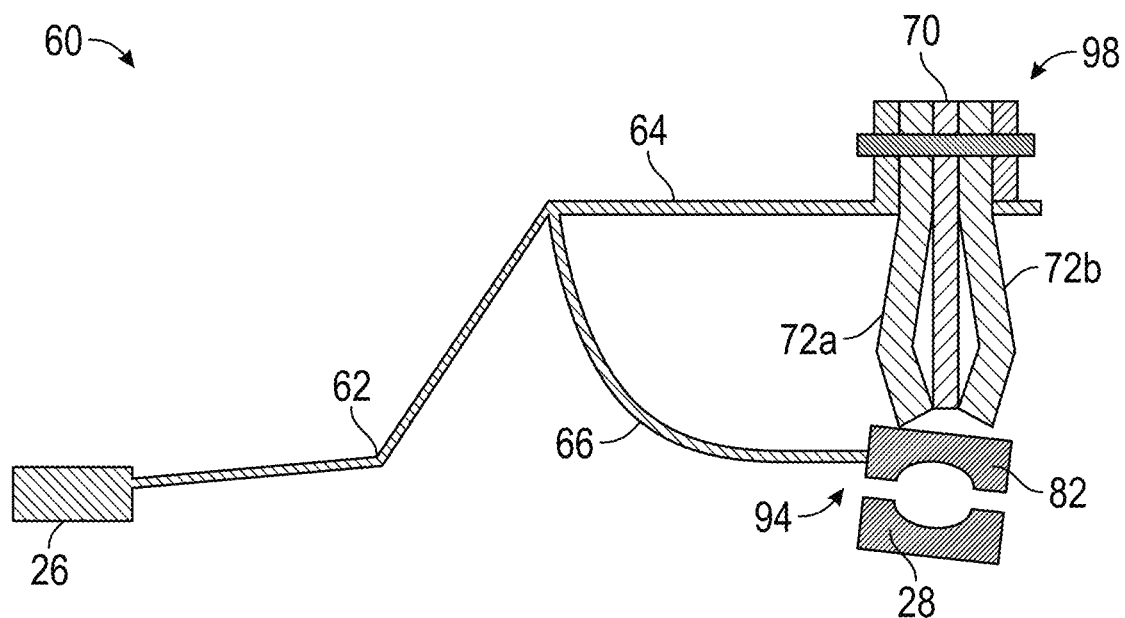
FIG. 13 is a second cross-sectional view of the embodiment of FIG. 11 in a fan blade off (FBO) event.

A fourth embodiment is illustrated in FIGS. 11-13. In this embodiment, two radial supports 72 are utilized, and are separated axially by the bumper 70. In this embodiment, the spokes 76 have a smaller cross-sectional area than would be necessary for a single support 72 configuration. During normal operation, the radially loading will be evenly distributed between the two axially separated radial supports 72. In an FBO event, however, the second bearing 28 may tilt or otherwise move, shifting the load toward a first radial support 72a and away from a second radial support 72b, causing the spokes 76a of the first radial support 72a to buckle. Once the spokes 76a of the first radial support 72a buckle, the stiffness of the first radial support 72a is greatly reduced, thus causing the spokes 76b of the second radial support 72b to buckle. This configuration is optimal for bearings 28 that cross-corner, but is also applicable to bearings 28 that do not cross-corner or tilt.

The embodiments disclosed herein provide that bearing 28 fails during an FBO event to limit the load and vibrations transferred from the rotor to the engine and aircraft structure caused by the resulting imbalance. The failure of the second bearing 28 is achieved via buckling of the second bearing support 66, thus improving low-cycle fatigue (LCF) performance.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing arrangement of a gas turbine engine, comprising:
   a bearing disposed in a bearing housing and supportive of a shaft;
   a bearing support extending from the bearing housing to the bearing to support the bearing; and
   one or more radial bearing supports including a plurality of radial spokes extending between the bearing housing and the bearing, the plurality of radial spokes configured to buckle under compression when radial loads at the bearing exceed a predetermined threshold;
   wherein a spoke tip of each of the radial spokes are configured to contact the bearing while not being secured thereto.

2. The bearing arrangement of claim 1, wherein the radial bearing support includes an outer ring disposed at the bearing housing, and the plurality of radial spokes extend from the outer ring to the bearing.

3. The bearing arrangement of claim 1, further comprising one or more bumpers axially offset from the radial bearing support configured to limit radial travel of the bearing.

4. The bearing arrangement of claim 3, wherein the plurality of spokes are configured to buckle tangentially.

5. The bearing arrangement of claim 4, wherein the one or more bumpers is two bumpers, and the radial bearing support is disposed axially between the two bumpers.

6. The bearing arrangement of claim 1, wherein the radial bearing support includes an inner ring disposed at the bearing, and the plurality of radial spokes extend from the inner ring to the bearing housing.

7. The bearing arrangement of claim 6, wherein the plurality of radial spokes are not secured to the bearing housing.

8. The bearing arrangement of claim 1, wherein the one or more radial supports includes a first radial support and a second radial support axially offset from the first radial support.

9. The bearing arrangement of claim 8, further comprising a bumper disposed axially between the first radial support and the second radial support.

10. A gas turbine engine, comprising:
    a combustor;
    a turbine driven by combustion products of the combustor;
    a shaft driven by rotation of the turbine; and
    a bearing arrangement supportive of the shaft, the bearing arrangement including:
       a bearing disposed in a bearing housing;
       a bearing support extending from the bearing housing to the bearing to support the bearing; and
       one or more radial bearing supports including a plurality of radial spokes extending between the bearing housing and the bearing, the plurality of radial spokes configured to buckle under compression when radial loads at the bearing exceed a predetermined threshold;

wherein a spoke tip of each of the radial spokes are configured to contact the bearing while not being secured thereto.

11. The gas turbine engine of claim 10, wherein the radial bearing support includes an outer ring disposed at the bearing housing, and the plurality of radial spokes extend from the outer ring to the bearing.

12. The gas turbine engine of claim 10, further comprising one or more bumpers axially offset from the radial bearing support configured to limit radial travel of the bearing.

13. The gas turbine engine of claim 12, wherein the plurality of spokes are configured to buckle tangentially.

14. The gas turbine engine of claim 13, wherein the one or more bumpers is two bumpers, and the radial bearing support is disposed axially between the two bumpers.

15. The gas turbine engine of claim 10, wherein the radial bearing support includes an inner ring disposed at the bearing, and the plurality of radial spokes extend from the inner ring to the bearing housing.

16. The gas turbine engine of claim 15, wherein the plurality of radial spokes are not secured to the bearing housing.

17. The gas turbine engine of claim 10, wherein the one or more radial supports includes a first radial support and a second radial support axially offset from the first radial support.

18. The gas turbine engine of claim 10, further comprising a bumper disposed axially between the first radial support and the second radial support.

* * * * *